United States Patent
Blevins

(10) Patent No.: US 9,529,867 B1
(45) Date of Patent: Dec. 27, 2016

(54) SYSTEM AND METHOD FOR PROVIDING A DYNAMIC DASHBOARD

(71) Applicant: Google Inc., Mountain View, CA (US)

(72) Inventor: Gregory Michael Blevins, San Francisco, CA (US)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 14/032,031

(22) Filed: Sep. 19, 2013

Related U.S. Application Data

(60) Provisional application No. 61/712,726, filed on Oct. 11, 2012.

(51) Int. Cl.
*G06F 17/30* (2006.01)

(52) U.S. Cl.
CPC ............... *G06F 17/30554* (2013.01)

(58) Field of Classification Search
None
See application file for complete search history.

(56) References Cited

U.S. PATENT DOCUMENTS

| | | | |
|---|---|---|---|
| 7,856,446 B2 * | 12/2010 | Brave et al. ............. | 707/776 |
| 2002/0035573 A1 * | 3/2002 | Black ................. | G06Q 30/02 |
| 2005/0102259 A1 * | 5/2005 | Kapur ............... | G06F 17/30867 |
| 2010/0076968 A1 * | 3/2010 | Boyns .............. | G06F 17/30241 |
| | | | 707/732 |
| 2010/0082604 A1 * | 4/2010 | Gutt et al. ............ | 707/721 |
| 2010/0241663 A1 * | 9/2010 | Huang et al. ............ | 707/770 |
| 2011/0093488 A1 * | 4/2011 | Amacker et al. .......... | 707/767 |
| 2011/0137880 A1 * | 6/2011 | Blais ................ | G06F 17/30398 |
| | | | 707/706 |
| 2012/0005224 A1 * | 1/2012 | Ahrens ................ | G06Q 10/10 |
| | | | 707/769 |
| 2012/0030018 A1 * | 2/2012 | Passmore .......... | G06F 17/30702 |
| | | | 705/14.52 |
| 2012/0173500 A1 * | 7/2012 | Chakrabarti et al. ........ | 707/706 |
| 2012/0246174 A1 * | 9/2012 | Spears et al. ............. | 707/749 |

* cited by examiner

*Primary Examiner* — James Trujillo
*Assistant Examiner* — Aida Tessema
(74) *Attorney, Agent, or Firm* — Dority & Manning, P.A.

(57) ABSTRACT

Systems and method for providing a list of search categories from which to perform a user action are provided. An initiation command is received from a client device, and a set of information corresponding to the client device is retrieved in response to receiving the initiation command. A subset of search categories is selected from a plurality of search categories based on the retrieved set of information corresponding to the client device. The subset of search categories is provided for display to the client device.

22 Claims, 7 Drawing Sheets

SYSTEM AND METHOD FOR PROVIDING A DYNAMIC DASHBOARD

RELATED APPLICATION

This application claims priority to U.S. provisional patent application 61/712,726, filed on Oct. 11, 2012, entitled "SYSTEM AND METHOD FOR PROVIDING A DYNAMIC DASHBOARD," the contents of which are hereby incorporated by reference.

FIELD

The present disclosure generally relates to locating points of interest, and, in particular, to automatically determining a set of search categories from which the user may initiate a search query.

BACKGROUND

Search queries are often submitted by users to locate points of interest. The user-submitted queries generally include information provided by the user, such as type of business, location, etc. For example, a user may search for restaurants in a particular city that the user is interested in dining out at. The results generated by the query may produce information such as an address, contact number, business hours, and third-party reviews of the listing.

SUMMARY

The disclosed subject matter relates to a machine-implemented method for providing a list of search categories from which to perform a user action are provided. An initiation command is received from a client device, and a set of information corresponding to the client device is retrieved in response to receiving the initiation command. A subset of search categories is selected from a plurality of search categories based on the retrieved set of information corresponding to the client device. The subset of search categories is provided for display to the client device.

The disclosed subject matter also relates to a machine-readable medium comprising instructions stored therein, which when executed by a system, cause the system to perform operations comprising receiving an initiation command from a client device. A set of information corresponding to the client device is retrieved in response to receiving the initiation command from the client device. A subset of search categories is selected from a plurality of search categories based on the retrieved set of information corresponding to the client device. The subset of search categories is provided for display to the client device. A selection of a search category from the subset of search categories is received, and a search based on the received selection and the retrieved set of information corresponding to the mobile device is performed. A listing of results of the performed search is provided for display.

According to various aspects of the subject technology, a system comprising one or more processors and a machine-readable medium is provided. The machine-readable medium comprises instructions stored therein, which when executed by the system, cause the system to perform operations comprising receiving an initiation command from a client device. A location of the client device, a local time of the client device, and search history information, are retrieved in response to receiving the initiation command from the client device. A subset of search categories is selected from a plurality of search categories based on the retrieved location of the client device, local time of the client device, and search history information. The subset of search categories is provided for display to the client device. A selection of a search category from the subset of search categories is received, and a search is performed based on the received selection and the retrieved set of information corresponding to the mobile device. A listing of results of the performed search is provided for display.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Search queries are often submitted by users to locate points of interest. While user-submitted queries including additional information provided by the user may produce accurate results, entering a search query each time a user tries to locate a point of interest may be time consuming and inefficient. Thus, it may be desirable to provide a web-based system that determines a set of search categories from which the user may initiate a search query. The disclosed subject matter relates to a machine-implemented method for providing a list of search categories from which to perform a user action are provided. An initiation command is received from a client device, and a set of information corresponding to the client device is retrieved in response to receiving the initiation command. A subset of search categories is selected from a plurality of search categories based on the retrieved set of information corresponding to the client device. The subset of search categories is provided for display to the client device.

Figure 1:
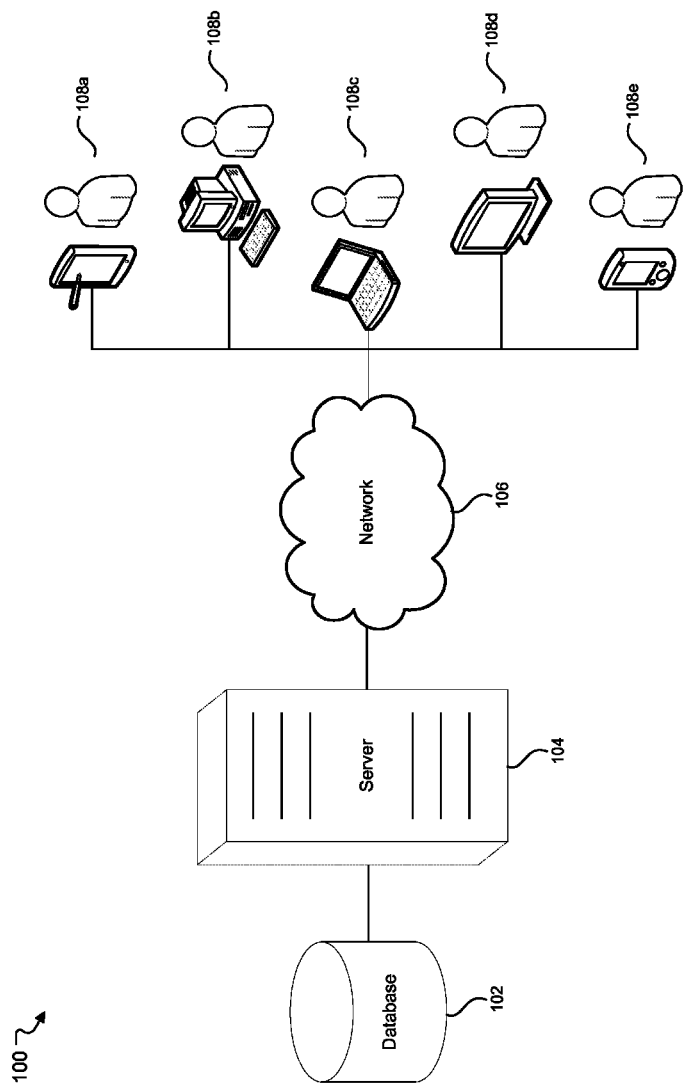
FIG. 1 illustrates an example network environment which provides for determining a set of search categories from which a user may initiate a search query.

FIG. 1 illustrates an example network environment which provides for determining a set of search categories from which a user may initiate a search query. Network environment 100 comprises one or more databases 102 (e.g., computer-readable storage devices) for storing a variety of data accessed by web-based applications. The network environment 100 further comprises one or more servers 104. Server 104 may receive requests from user-operated client devices 108a-108e. Server 104 and client devices 108a-108e may be communicatively coupled through a network 106. In some implementations, client devices 108a-108e may request data from server 104. Upon receiving the request, server 104 may retrieve a set of data from database 102 and serve the set of information to client devices 108a-108e.

Each of client devices 108a-108e can represent various forms of processing devices. Example processing devices can include a desktop computer, a laptop computer, a handheld computer, a television with one or more processors attached or coupled thereto, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Each of client devices 108a-108e may be any machine configured to generate and transmit a signal that includes location information (e.g., GPS coordinates) to server 104. In some aspects, client devices 108a-108e may include one or more client applications (e.g., mapping applications, GPS applications, or other processes) configured to generate and transmit GPS signals to a server. The GPS signals may include GPS coordinates (e.g., longitude and latitude coordinates) and, in some cases, a time stamp indicating when the GPS signal was generated.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
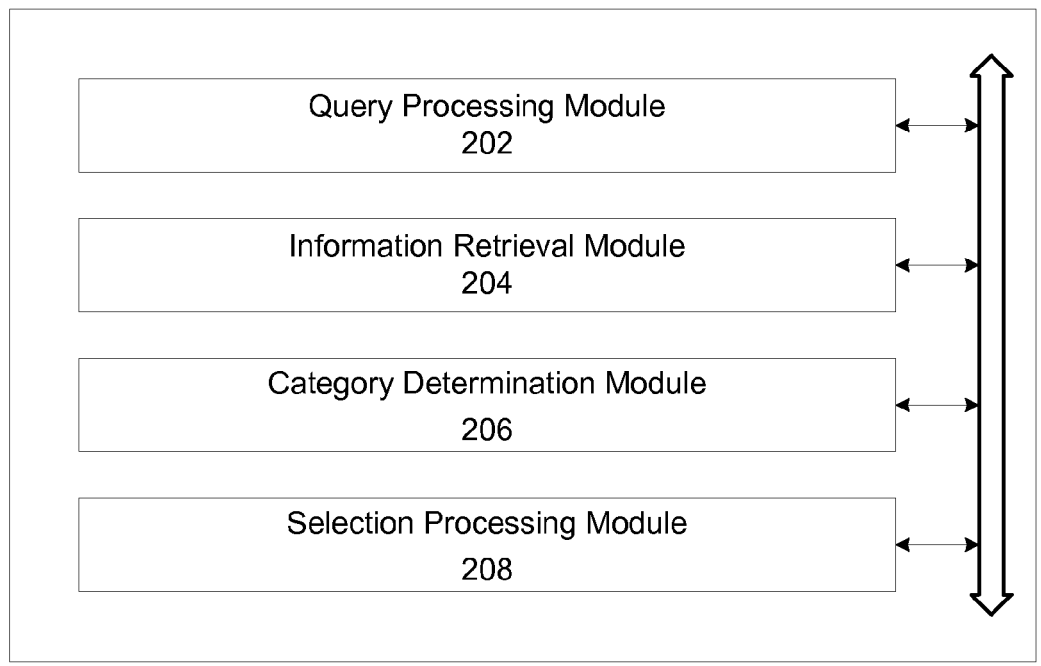
FIG. 2 illustrates an example of a server system for determining a set of search categories from which the user may initiate a search query.

FIG. 2 illustrates an example of a server system for determining a set of search categories from which the user may initiate a search query. System 200 includes query processing module 202, information retrieval module 204, category determination module 206, and selection processing module 208. These modules, which are in communication with one another, process information retrieved from database 102 in order to a set of search categories from which the user may initiate a search based on a user query and additional information retrieved from the user operated client device. For example, a user query may be received by query processing module 202. Upon receiving the user query, information retrieval module 204 may retrieve location information of the user operated client device. Information retrieval module 204 may further retrieve information such as a search history from the client device or an aggregate search volume from a database. Based on the retrieved information, category determination model 206 may determine appropriate search categories to present to the user operated client device. Selection processing module 208 may receive selection of the search categories presented to the user operated client device.

In some aspects, the modules may be implemented in software (e.g., subroutines and code). The software implementation of the modules may operate on web browsers running on client devices 108a-108e. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
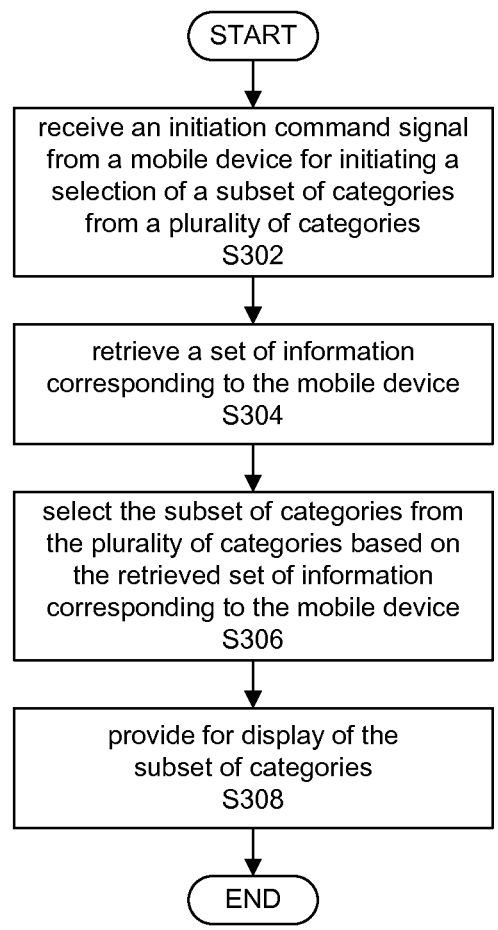
FIG. 3 illustrates an example method for providing a set of search categories based on information retrieved from a user operated client device.

FIG. 3 illustrates an example method for providing a set of search categories based on information retrieved from a user operated client device. An initiation command signal is received from a client device for initiating a selection of a subset of search categories from a plurality of search categories in S302. The plurality of search categories from which the subset may be selected may include search categories such as restaurants, bars, coffee shops, retail stores, banks, attractions and points of interests, transportation, lodging, etc. The initiation command may be received when an application is launched by a user on the client device. Once an initiation command is received, a set of information corresponding to the client device is retrieved from the client device. The set of information corresponding to the client device may include temporal information and location information of the client device. The temporal information may correspond to a local time at a location of the client device, and the location information may comprise GPS coordinates of the location of the client device.

In some implementations, search history information may be retrieved from the client device or from a database (e.g., a database on a server). The search history information may include any searches performed on other applications of the client device. In other words, history information from search queries performed in a variety of applications (e.g., mapping, peer review, social networking, etc.) on the client device may be retrieved. Additional related search history information may further be retrieved from one or more databases. The related search history information may include searches performed on other client devices by other users that are determined to be in the same location as or within the vicinity of the retrieved location of the client device.

Once the set of information corresponding to the client device is retrieved, the subset of search categories is inferred from the plurality of search categories. The subset of search categories may be inferred based a time and day local to the client device, and on the location of the client device. For example, if the temporal and location information indicates that the client device is in New York City at 8:00 PM on Friday, search categories such as restaurants, movie times, and bars may be inferred. In other words, the inferences may be made to return search categories that are time and location specific to the client device.

The inference may further be based on the retrieved search history information corresponding to the client device. For example, if the search history indicates that the user has searched for "Italian restaurants" in the past, a category for "Italian restaurants" may inferred as a user preference and selected as a categorical result to be presented on the client device. Related search history information retrieved from one or more databases and corresponding to searches performed by other client devices may also be considered in inferring a user preference. For example, the one or more databases may include a history of search queries performed by other client devices that indicates a high frequency of searches for "oyster bars" in the Fisherman's Wharf area of San Francisco. As a result, a category for "oyster bars" may inferred and selected as a categorical result to be presented on to a client device that has been determined to be operating in the Fisherman's Wharf area when the application is launched.

In some implementations, a location history of the client device (e.g., a mobile device) may be utilized to infer search categories to be presented on to the client device. For example, a user may be presented with a user interface where the user may receive a request to use their location information. The request may include information about how the user location information, including location history, will be used. If the user provides their permission, the location history of the client device can be used to infer search categories to be presented to the user on the client device. If the user does not provide their permission, the location history will not be used. Furthermore, the user interface may also be configured to allow the user to modify or revoke any permissions at any time.

Location history may provide information such as places that the user of the client device frequently travels to and may be familiar with as opposed to places that are foreign to the user. For example, if the user spends a significant amount of time in one area (e.g., during the work week and at the location of the user's employment), it may be inferred that the user is familiar with all the local restaurant and coffee shops, and that the user is not likely to be looking for lodging options. Thus, search categories for restaurants, coffee shops, and lodging may not presented to the user operated client device as they may be determined uninformative. Conversely, if the user is determined to be at a location that is determined to be new and unfamiliar to user, search categories such as restaurants, coffee shops, lodging, as well as transportation, may be inferred as informative to the user and presented to the user operated device.

The determined subset of search categories are provided for display to the user on the client device in S308. Each search category may be displayed as an icon on a display area or as text in a list of search categories. In some implementations, the order in which the subset of search categories is displayed may be determined based on a ranking of the search categories. The ranking may be determined based on the set of information corresponding to the client device including temporal information, location information, and search history information. For example, the order in which the search categories are sorted may be determined based on the most common search category search performed by the user operated client device of the most popular search category searches performed by other client devices in the same area as the user operated client device. The order may also be determined based on the most common category search performed at a particular time of the day.

The search categories displayed on the client device are selectable by the user. A selection of a search category from the subset of search categories may be received from the user of the client device, as described in further detail by reference to FIG. 5.

Figure 4:
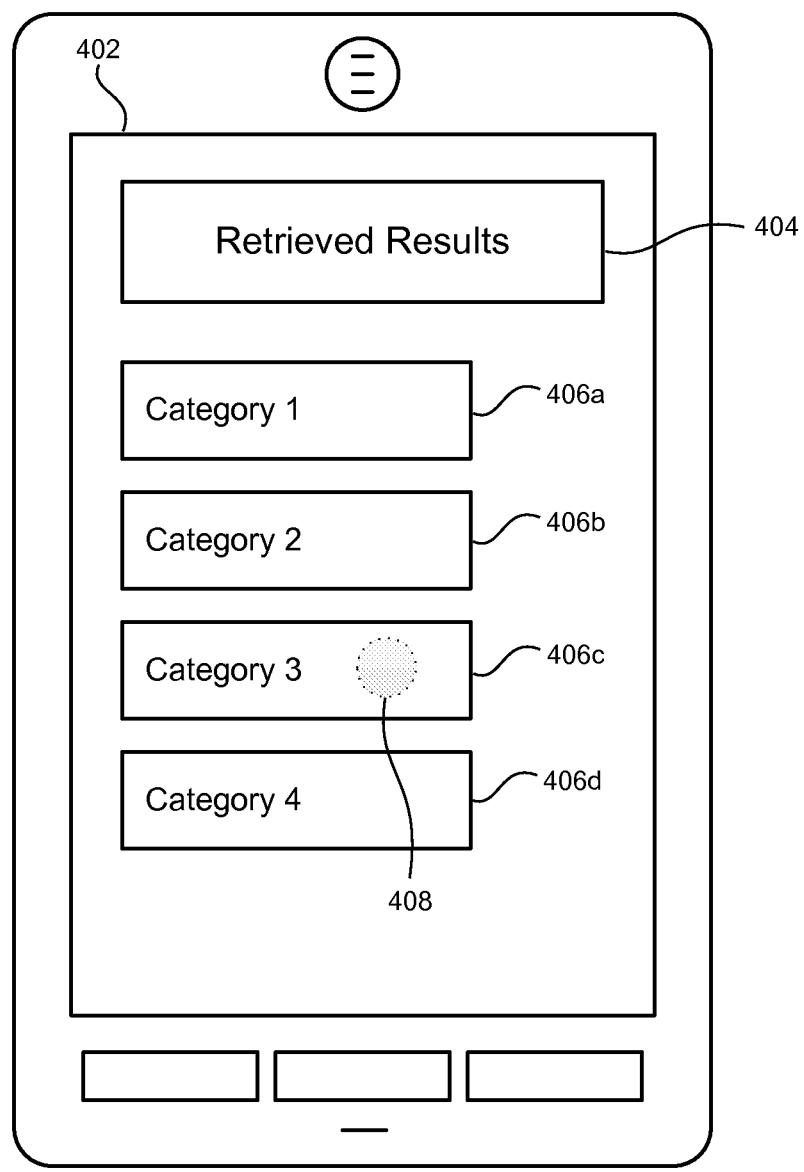
FIG. 4 provides a graphical representation of a client device providing a set of search categories based on information retrieved from a user operated client device.

FIG. 4 provides a graphical representation of a client device providing a set of search categories based on information retrieved from a user operated client device. Display 402 of the client device may provide a listing of retrieved results 404 that correspond to a set of search categories. Each of search categories 406a-406d represents a search category inferred based on the retrieved set of information corresponding to the client device. Each of search categories 406a-406d may be displayed as a list of text or a group of icons that are selectable by a user of the client device. In this example, selection 408 indicates that search category 3 has been selected by the user on the client device. The selection may be received from input devices such as keyboards and pointing devices, including touchscreen-enabled keyboards and touchscreen-enabled pointing devices.

Figure 5:
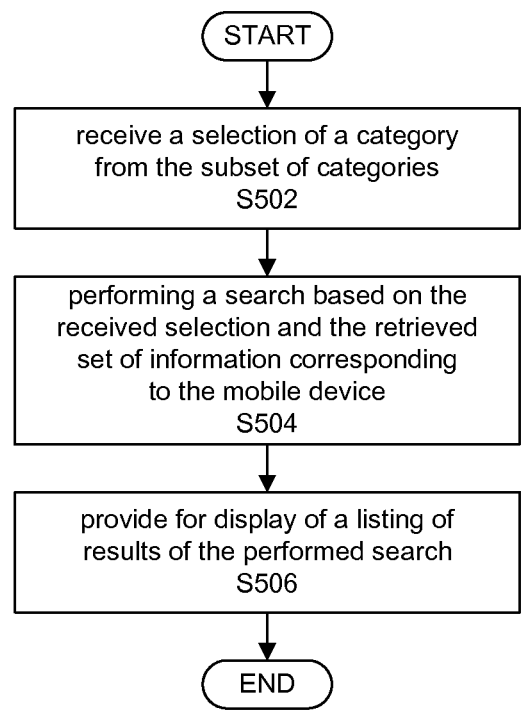
FIG. 5 illustrates an example method for providing for display a search result corresponding to a user-selected search category.

FIG. 5 illustrates an example method for providing for display search results based off of a user selection from a set of search categories. A selection of a search category from the subset of search categories may be received from the user of the client device in S502. The user selection activates the selected search category and a search may be performed based on the received selection and the retrieved set of information corresponding to the mobile device in S504. Further to the example described above, if the temporal and location information indicates that the client device is in New York City at 8:00 PM on Friday, search categories such as restaurants, movie times, and bars may be inferred and presented to the user on the client device as retrieved results. If the user selects the search category for restaurants from the retrieved results, a search is performed based on the restaurants category as well as the time at and the location of the client device. The listing of results of the performed search is provided for display in S508.

The time information in this example may be used to filter the results so that only restaurants that are open at the time the search is performed are presented on the client device. The time information may further be used to filter the results so that only time appropriate results are returned. For example, the search being performed at 8:00 PM on a Friday night may produce a listing that is focused on establishments that serve dinner while filtering out establishments that specialize in breakfast and lunch. In other words, the results are generated based on an inference of the user's inclination. In this case, a selection of the "restaurant" category at 8:00 PM on a Friday indicates that the user is more likely to be looking for a sit down place to eat dinner as opposed to grabbing a sandwich at a local café.

The retrieved location information may be used to list only the results that are within a threshold proximity of the location of the user operated client device. For example, a search request may only return restaurants within a five mile radius of the location of the client device. The threshold distance (five miles in this example) may be user determined or determined based on the density of establishments of a selected search category in the vicinity of the retrieved location of the client device. A higher density of establishments of the selected search category may cause the threshold distance to be lowered. Similarly, a determination that the client device is located in an urban neighborhood (as opposed to a rural neighborhood) may also cause a lowering of the threshold distance. The location information may further be used to sort the results in order of closest to farthest.

Figure 6:
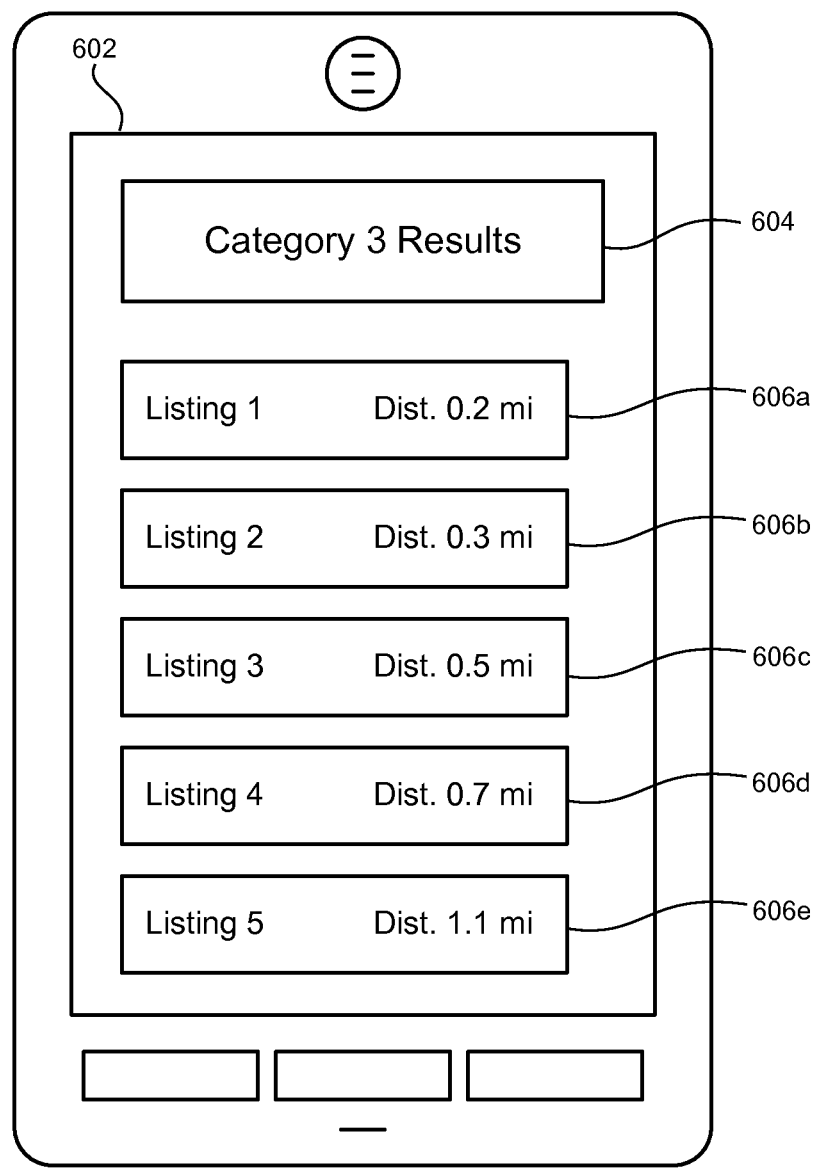
FIG. 6 provides a graphical representation of a client device providing a search result corresponding to a user-selected search category.

FIG. 6 provides a graphical representation of a mobile device providing a set of listings corresponding to a user-selected search category. Display 602 of the client device may provide a listing of results 604 that correspond to a selected search category. In the example show in FIG. 6, results for search category 3 are provided as a result of the selection of search category 3. Each of listings 606*a*-606*e* represents a listing result of a search performed based on the selection of search category 3. Each of listings 606*a*-606*e* may be displayed as a list of text or a group of icons that are selectable by a user of the client device. A selection of the listing may be received from input devices such as keyboards and pointing devices, including touchscreen-enabled keyboards and touchscreen-enabled pointing devices. Upon receiving a selection of one of the listings 606*a*-606*e*, additional information of the listing may be provided to the client device.

Further to the example described above, results from a selection of the restaurant search category may be presented on a client device as text or an icon for user selection. The results in this example correspond to individual restaurants. Upon selection of one of the restaurants, additional information such as an address, a phone number, a website, and reviews for the restaurant may be provided. The additional information may be provided as links to other applications of the client device. For example, the address of the restaurant may be provided as a link to a mapping application, the phone number of the restaurant may be provided as a link to a phone application, and the website of the restaurant may be provided as a link to a browser application. Selection of any of these links may cause the corresponding application to launch.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 7:
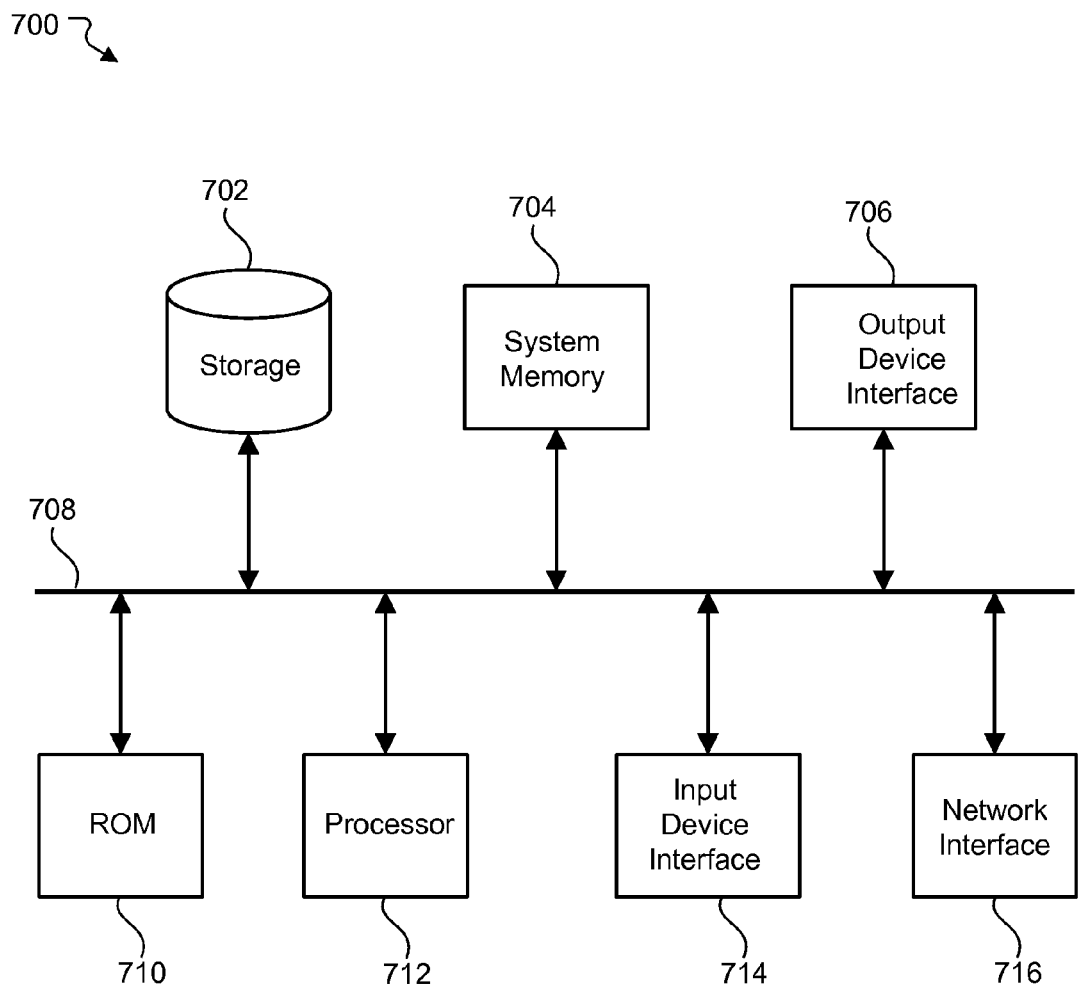
FIG. 7 conceptually illustrates an example electronic system with which some implementations of the subject technology are implemented.

FIG. 7 conceptually illustrates an example electronic system with which some implementations of the subject technology are implemented. Electronic system 700 can be a computer, phone, PDA, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for determining a set of search categories based on information retrieved from a user operated mobile device in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interface 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers, such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for providing a list of search categories from which to perform a user action, the method comprising:
   retrieving, by the one or more computing devices, a set of information corresponding to a client device, wherein the set of information corresponding to the client device comprises a current location of the client device and a location history for the client device;
   determining, by the one or more computing devices, whether the current location of client device appears in the location history of the client device at a frequency that is greater than a predetermined threshold;
   selecting, by the one or more computing devices, a subset of search categories from a plurality of search categories based on the retrieved set of information corresponding to the client device, wherein the selecting of the subset of search categories is performed without receiving any portion of a search string from a user, and wherein, when the current location of the client device is determined to appear in the location history of the client device at the frequency that is greater than the predetermined threshold, selecting, by the one or more computing devices, the subset of search categories comprises selecting, by the one or more computing devices, a predetermined set of search categories designed for users familiar with their current location;
   providing, by the one or more computing devices, for display of the subset of search categories;
   receiving, by the one or more computing devices, a selection of a first search category from the subset of search categories;
   performing, by the one or more computing devices, a search based on the selected first search category and the set of information corresponding to the client device to identify a plurality of search results; and
   providing, by the one or more computing devices, for display of a listing of at least a portion of the plurality of search results of the performed search.

2. The computer-implemented method of claim 1, wherein the subset of search categories is selected from the plurality of search categories without receiving additional commands from the client device.

3. The computer-implemented method of claim 1, wherein the set of information corresponding to the client device further comprises a local time of day of the client device, wherein the selecting the subset of search categories from the plurality of search categories is based on the local time of day at the client device.

4. The computer-implemented method of claim 1, wherein the set of information corresponding to the client device comprises a client search history from the client device, and wherein the selecting the subset of search categories from the plurality of search categories is further based at least in part on the client search history from the client device.

5. The computer-implemented method of claim 3, further comprising: receiving, by the one or more computing devices, a set of search history information for a plurality of additional users that describes an aggregate volume of searches performed by the plurality of additional users from respective locations within a predetermined distance of the location of the client device or at respective times within a predetermined time from the local time of day of the client device, wherein the selecting the subset of search categories from the plurality' of search categories is further based at least in part on the set of search history information for the plurality of additional users.

6. The computer-implemented method of claim 1, wherein selecting the subset of search categories from the plurality of search categories comprises ranking each of the plurality of search categories based on the retrieved set of information corresponding to the client device and selecting a predetermined number of search categories with the highest rankings.

7. The computer-implemented method of claim 6, further comprising receiving; by the one or more computing devices; a set of search history information for a plurality of additional users that describes an aggregate volume of searches performed by the plurality of additional users, wherein a search category identified in the aggregate volume of searches performed by the plurality of additional users as having a higher frequency of search requests is ranked higher than a search category identified in the aggregate volume of searches as having a lower frequency of search requests.

8. The computer-implemented method of claim 5; wherein a search category identified in the search history information and corresponding to a search originating from an additional client device determined to be closer to the location of the client device is ranked higher than a search category identified in the search history information and corresponding to a search originating from an additional client device determined to be farther from the location of the client device.

9. A non-transitory machine-readable medium comprising instructions stored therein, which when executed by one or more processors of a system, cause the system to perform operations comprising:
　receiving an initiation command from a client device, the initiation command not including any portion of a search string;
　retrieving a set of information corresponding to the client device in response to receiving the initiation command from the client device wherein the set of information corresponding to the client device comprises a current cation of the client device and a location history for the client device;
　determining whether the current location of the client device appears in the location history of the client device at a frequency that is than a redetermined threshold;
　selecting a subset of search categories from a plurality of search categories based on the retrieved set of information corresponding to the client device, wherein the selecting of the subset of search categories is performed without receiving any portion of a search string from a user, and wherein, when the current location of the client device is determined to appear in the location history of the client device at the frequency that is greater than the predetermined threshold, selectin the subset of search categories comprises selecting a predetermined set of search categories designed for users familiar with their current location;
　providing for display of the subset of search categories to the client device;
　receiving a selection of a first search category from the subset of search categories;
　performing a search based on the selected first category and the retrieved set of information corresponding to the client device to identify a plurality of search results; and
　providing for display of a listing of at least a portion of the plurality of search results of the performed search.

10. The machine-readable medium of claim 9, wherein the set of information corresponding to the client device further comprises a local time of day of the client device, wherein the selecting the subset of search categories from the plurality of search categories is based on the local time of day at the client device.

11. The machine-readable medium of claim 9, wherein the set of information corresponding to the client device comprises a client search history from the client device, and wherein the selecting the subset of search categories from the plurality of search categories is further based on the client search history from the client device.

12. The machine-readable medium of claim 9, wherein the operations further comprise receiving a set of search history information for a plurality of additional users that describes an aggregate volume of searches performed by the plurality of additional users from at least one of a location within a predetermined distance of the location of the client device and a time within a predetermined amount of time from a local time of day of the client device, and wherein the selecting the subset of search categories from the plurality of search categories is further based on the set of search history information for the plurality of additional users.

13. The machine-readable medium of claim 9, wherein selecting the subset of search categories from the plurality of search categories comprises ranking each of the plurality of search categories based on the retrieved set of information corresponding to the client device and selecting a predetermined number of search categories with the highest rankings.

14. The computer-implemented method of claim 1, wherein the set of information corresponding to the client device comprises a local time of day of the client device, and wherein performing, by the one or more computing devices, the search based on the selected first search category and the retrieved set of information corresponding to the client device comprises:
　performing, by the one or more computing devices, the search based on the selected first search category to obtain a plurality of initial results; and
　filtering, by the one or more computing device, the plurality of initial results based on the local time of day of the client device to obtain a plurality of filtered results.

15. The computer-implemented method of claim 14, wherein filtering, by the one or more computing device, the plurality of initial results based on the local time of day of the client device comprises discarding, by the one or more computing devices, any of the plurality of initial results that correspond to a point of interest that is not open at the local time of day of the client device.

16. The computer-implemented method of claim 14, wherein:
　the selected first search category comprises a restaurant search category; and
　filtering, by the one or more computing device, the plurality of initial results based on the local time of day of the client device comprises selecting, by the one or more computing devices, initial results that correspond to restaurants featuring menu items that are appropriate for the local time of day of the client device.

17. The computer-implemented method of claim 3, wherein the information corresponding to the client device comprises the location of the client device, and wherein performing, by the one or more computing devices, the search based on the selected first search category and the retrieved set of information corresponding to the client device comprises:
　performing, by the one or more computing devices, the search based on the selected first search category and the location of the client device to obtain a plurality of initial results; and
　filtering, by the one or more computing devices, the plurality of initial results to remove any initial results corresponding to locations that are not within a threshold proximity of the location of the client device.

18. The computer-implemented method of claim 17, further comprising, at least prior to filtering the plurality of initial results:

determining, by the one or more computing devices, a density of establishments of the selected first search category at the location of the client device; and determining; by the one or more computing devices; the threshold proximity based at least in part on the density of establishments of the selected first search category at the location of the client device.

19. A computer-implemented method for providing a list of search categories from which to perform a user action, the method comprising:

retrieving, by the one or more computing devices, a set of information corresponding to a client device; wherein the information corresponding to the client device comprises at least one of a location of the client device and a local time of day of the client device;

selecting, by the one or more computing devices, a subset of search categories from a plurality of search categories based on the at least one of the location of the client device and the local time of day at the client device, wherein the selecting of the subset of search categories is performed without receiving any portion of a search string from a user;

providing, by the one or more computing devices, for display of the subset of search categories;

receiving, by the one or more computing devices, a selection of a first search category from the subset of search categories;

performing, by the one or more computing devices, a search based on the selected first search category and the set of information corresponding to the client device to identify a plurality of search results, wherein performing, by the one or more computing devices, the search based on the selected first search category and the retrieved set of information corresponding to the client device comprises:

performing, by the one or more computing devices, the search based on the selected first search category and the location of the client device to obtain a plurality of initial results;

determining, by the one or more computing devices, a density of establishments of the selected first search category at the location of the client device;

determining, by the one or more computing devices, a threshold proximity based on the density of establishments of the selected first search category at the location of the client device; and filtering, by the one or more computing devices, the plurality of initial results to remove any initial results corresponding to locations that are not within the threshold proximity of the location of the client device; and providing, by the one or more computing devices, for display of a listing of at least a portion of plurality of search results of the performed search.

20. The computer-implemented method of claim 19, wherein:

the set of information corresponding to the client device comprises the location of the client device and further comprises a location history for the client device;

the computer-implemented method further comprises:

determining, by the one or more computing devices, whether the current location of the client device appears in the location history of the client device at a frequency greater than a predetermined threshold; and when the current location of the client device is determined to appear in the location history of the client device at a frequency greater than the predetermined threshold, selecting, by the one or more computing devices, the subset of search categories comprises selecting, by the one or more computing devices, a predetermined set of search categories designed for users familiar with their current location.

21. The computer-implemented method of claim 19, wherein performing the search further comprises discarding, by the one or more computing devices, any of the plurality of initial results that correspond to a point of interest that is not open at the local time of day of the client device.

22. The computer-implemented method of claim 19, wherein the set of information corresponding to the client device further comprises a client search history from the client device, and wherein the selecting the subset of search categories from the plurality of search categories is further based at least in part on the client search history from the client device.

\* \* \* \* \*